United States Patent
Rowe

[11] 3,936,553
[45] Feb. 3, 1976

[54] INSULATING MATERIALS

[75] Inventor: Alexander W. Rowe, Johannesburg, South Africa

[73] Assignee: Rorand (Proprietary) Limited, South Africa

[22] Filed: Nov. 23, 1973

[21] Appl. No.: 418,202

[30] Foreign Application Priority Data
Nov. 24, 1972 South Africa.................... 72/8342

[52] U.S. Cl. ..................... 428/81; 52/403; 52/615; 428/119; 428/133; 428/179; 428/322
[51] Int. Cl.² .. B32B 3/12; B32B 5/18; B32B 27/38; E04B 2/28
[58] Field of Search ......... 161/39, 69, 161, 44, 111, 161/149, 186; 52/615, 403, 393, 613, 624; 428/119, 133, 179, 322, 81

[56] References Cited
UNITED STATES PATENTS

| | | | |
|---|---|---|---|
| 1,962,868 | 6/1934 | Gregg | 161/69 X |
| 2,962,409 | 11/1960 | Ludlow et al. | 156/229 X |
| 3,054,213 | 9/1962 | Mathues | 52/403 |
| 3,262,521 | 7/1966 | Warnaka | 52/615 X |
| 3,354,021 | 11/1967 | Royet | 161/111 |
| 3,405,496 | 10/1968 | VanDer Meer | 52/615 |
| 3,570,201 | 3/1971 | Barroero | 52/172 |
| 3,793,131 | 2/1974 | Hedges | 161/44 X |

Primary Examiner—Philip Dier
Attorney, Agent, or Firm—Stevens, Davis, Miller & Mosher

[57]    ABSTRACT

Insulation material comprising a pair of generally parallel spaced surface sheets of impervious material sealed together through thermally insulating material at their free edges. The surface sheets are held in spaced relation by a series of transverse pins spaced apart over the area of the surface sheets and the space between the latter is evacuated.

9 Claims, 3 Drawing Figures

INSULATING MATERIALS

This invention relates to thermal insulating materials of the type which can be made up into insulating panels or walls of various shapes. More particularly the invention relates to insulating material which utilize a vacuum to prevent or minimize heat transfer through the material.

Various attempts have been made to provide insulating panels and the like which utilize the insulating properties of a vacuum to prevent heat transfer by conduction therethrough. The problem encountered with the production of such a panel lies in the support required of the walls or outer surface skins thereof against the loading imposed through the action of atmospheric pressure. It has generally been considered that a continuous support should be provided between the outer walls or skins. Thus foams, granular or fibre glass types of support have been used heretofore.

However, the insulating properties of these panels have, in applicants' opinion, been decreased as a result of the use of such continuous supports.

It is accordingly the object of this invention to provide an improved insulating material of the above described general type wherein the insulating effect of the vacuum is impaired to a minimum.

In accordance with this invention there is provided insulation material comprising a pair of generally parallel impervious surface sheets of material sealed together through thermally insulating material at their free edges and held in spaced relation by a series of transverse pins spaced apart over the area of the surface sheets, the space between the surface sheets being evacuated.

Further features of the invention provide for the insulation material to be in the form of a panel, for the surface sheets to be of heat reflective material and for the edges of the panel to be sealed together by a syntactic foam material.

It has been found that by using pins made of a material having a high resistance to compression an effective evacuated panel can be constructed. Thus the pins are preferably made of pure epoxy, reinforced epoxy such as glass fibre filled epoxy, certain nylons and the like. It will be understood that such material should also have a low thermal conductivity. With the correct selection of materials for the pins these may cover, in cross-section, an area of only about 1% of the area of the surface sheets and thus they will transmit very little heat through an insulation material made according to this invention.

The pins may also be split transversely along their lengths to enable a sheet of reflective material to be supported between the surface sheets of the panel. Such a sheet of reflective material would serve to prevent radiative heat transfer and would thus be of a suitable material for this purpose. Alternatively, the pins may extend through the intermediate sheet of reflective material with the latter being held in position by sleeves or washers located over the pins and supporting the intermediate sheet in its position parallel to the surface sheets.

It will be understood that the surface sheets must be sufficiently rigid to support the atmospheric load between the pins. The sheets may be preshaped to provide rigidity to a panel and so that the effect of evacuation will not deform the surfaces of the panel into continuous cavities between the support pins. As seen in FIGS. 1 and 2, the sheets are of a concave shape between the internal support pins 6 with spaced indentations 9. The surface sheets are sealed together around their free edges in any convenient way which allows for a vacuum to be created between them. Thus syntactic foam, being a mixture of epoxy or other synthetic plastics material and microscopic hollow glass or ceramic spheres is considered suitable. Alternatively metal webs may be used wherein conduction is minimized by selection of the thickness and material of the webs.

Preferably gettering material will be placed between the panels to maintain the vacuum applied when the panel is manufactured.

Two preferred embodiments of the invention will now be described with reference to the accompanying drawings in which.

In the embodiments illustrated the panel comprises a pair of spaced substantially parallel surface sheets 1 made of a suitably rigid material such as aluminium which also acts to reflect a certain amount of heat. The sheets are preferably preshaped to have a somewhat quilted appearance.

The two surface sheets are held in spaced relation by a series of spaced transverse pins 2 which are adhesively secured to either of or both the two sheets. The pins are located at the depressions formed by the preshaping and are made for example from glass fibre reinforced epoxy resin. The edges 3 of the surface sheets are sealed together by means of syntactic foam 4 and the interior of the panel is then evacuated.

Prior to the sealing of the surface sheets to each other gettering material such as barium powder is introduced into the space between the panels to maintain the vacuum.

Figure 1:
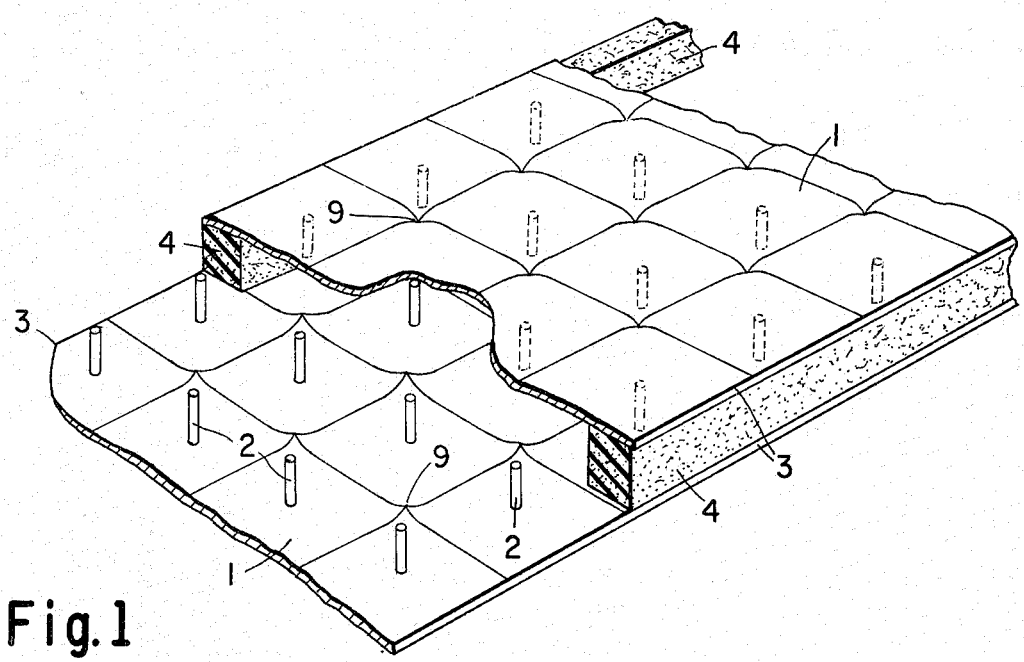
FIG. 1 is an isometric illustration of one type of panel.
Figure 2:
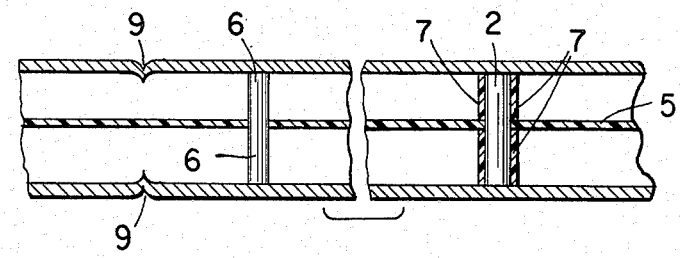
FIG. 2 illustrates two alternative methods of supporting an intermediate sheet of insulating material, and FIG. 3 indicates a method used to assist the seal around the edge of the panel.

In the embodiment illustrated in FIG. 2 an intermediate sheet 5 of insulating material may be located between the surface sheets. This intermediate sheet could be made of a commercially available polyester film aluminium coatings for example to prevent the transmission of radiative heat. The use of other plastic films having a metallic coating thereon to prevent the transmission of radiation is also known as disclosed in U.S. Pat. Nos. 2,183,790, 3,290,203, and 3,681,179. Such an intermediate sheet could be held in position either by providing short pins 6 on each surface sheet which co-operate to clamp the intermediate sheet therebetween or by providing sleeves or washers 7 on the outside of the pins. In the latter case the intermediate sheet would be perforated so that the pins may pass therethrough.

Figure 3:
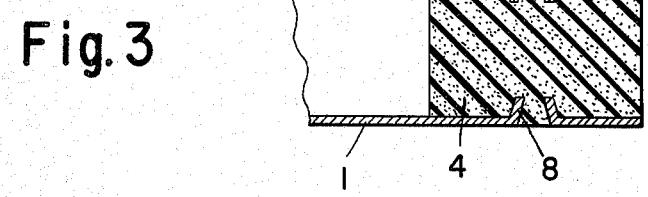

It has been found that better mechanical sealing is obtained around the edges of the surface sheets in contact with the syntactic foam if the two components are interlocked. One convenient manner is illustrated in FIG. 3 where locking formations 8 are pressed from the surface sheets 1 to engage in the foam 4.

The heat flux through radiation scattering materials in a high vacuum is very sensitive to compressive load. A graph of this heat flux versus compressive load on a log log basis generally falls on a straight line with a slope of between 0.5 and 0.67. As a consequence a nonuniform loading featuring point loads under high stress and broad areas of zero loading will provide most effective insulation.

It will be understood that many variations may be made to the above described embodiments of the invention without departing from the scope of the invention. The pins may be varied in form from those described provided that the surface sheets remain supported only over a relatively small part of their total area.

What I claim as new and desire to secure by Letters Patent is:

1. Insulation material comprising a pair of generally parallel surface sheets of fluid impervious material sealed together through thermally insulating material at their free edges and held in spaced relation by a series of transverse pins spaced apart over the area of the surface sheets, the space between the surface sheets being evacuated and provided with a plastic film having a metallic coating.

2. Insulating material is claimed in claim 1 in which each surface sheet "is provided with a plurality of spaced indentations therein giving it a quilted appearance with the sheets being of concave shape between said internal pins."

3. Insulating material as claimed in claim 1 in which said surface sheets are heat reflective material.

4. Insulating material as claimed in claim 1 in which the sealing on the edges of the surface sheets is effected by means of syntactic foam which is disposed between the sheets along the edges thereof.

5. Insulating material as claimed in claim 4 in which the edges of the surface sheets are mechanically interlocked with the syntactic foam.

6. Insulating material as claimed in claim 1 in which said radiation transmission preventing material comprises a sheet of such material located between the surface sheets and held in spaced relationship thereto on the pins.

7. Insulating material as claimed in claim 1 including a gettering agent in the space between the surface panels.

8. Insulating material as claimed in claim 1 in which each pin is secured to one of the surface sheets by means of an adhesive.

9. Insulating material as claimed in claim 1 in which each pin is secured to both surface sheets by means of an adhesive.

* * * * *